(12) United States Patent  
Rousu et al.

(10) Patent No.: US 9,319,987 B2  
(45) Date of Patent: Apr. 19, 2016

(54) MOBILE COMMUNICATION (71) Applicant: BROADCOM CORPORATION, Irvine, CA (US)

(72) Inventors: Seppo Rousu, Oulu (FI); Samuel Vehkalahti, Haukipudas (FI)

(73) Assignee: BROADCOM CORPORATION, Irvine, CA (US)

( * ) Notice: Subject to any disclaimer, the term of this patent is extended or adjusted under 35 U.S.C. 154(b) by 36 days.

(21) Appl. No.: 14/101,773

(22) Filed: Dec. 10, 2013

(65) Prior Publication Data

US 2014/0162574 A1 Jun. 12, 2014

(30) Foreign Application Priority Data

Dec. 10, 2012 (GB) .................................. 1222189.1

(51) Int. Cl.
| | |
|---|---|
| H04B 1/44 | (2006.01) |
| H04W 52/04 | (2009.01) |
| H04W 52/42 | (2009.01) |
| H04B 7/06 | (2006.01) |
| H04B 7/08 | (2006.01) |
| H04B 7/04 | (2006.01) |

(52) U.S. Cl.
CPC .............. H04W 52/04 (2013.01); H04B 7/0608 (2013.01); H04B 7/0817 (2013.01); H04W 52/42 (2013.01); *H04B 7/0413* (2013.01)

(58) Field of Classification Search
CPC .. H04B 7/0413; H04B 7/0817; H04B 7/0608; H04W 52/04; H04W 52/42; H04W 52/16
USPC .................. 455/78, 101, 277.1, 277.2, 67.11; 375/267, 299
See application file for complete search history.

(56) References Cited

U.S. PATENT DOCUMENTS

| 2005/0266904 A1 | 12/2005 | Kitaji et al. |
| 2007/0173208 A1* | 7/2007 | Nishio et al. .................... 455/78 |

(Continued)

FOREIGN PATENT DOCUMENTS

| EP | 0 987 834 A2 | 3/2000 |
| EP | 1 248 386 A1 | 10/2002 |
| EP | 1 715 600 A1 | 10/2006 |

(Continued)

OTHER PUBLICATIONS

UKIPO Combined Search and Examination Report mailed Jun. 10, 2013 and issued in a related GB Application No. GB1222189.1 (6 pages).

*Primary Examiner* — Ping Hsieh  
(74) *Attorney, Agent, or Firm* — Foley & Lardner LLP; Christopher J. McKenna; Paul M. H. Pua (57) ABSTRACT

An apparatus for use in a mobile device includes a switch unit configured to switch a common connection of a transmitter and a first receiver from a first antenna to a second antenna and a connection of a respective second receiver from the second antenna to the first antenna; and a processing system configured to detect a switch condition that the transmitter needs to transmit via the second antenna, obtain power-related reception parameters of said first and said second receivers, cause the switch unit to switch the common connection of the transmitter and the first receiver so that the transmitter transmits via the second antenna, and adjust the power of the transmitter in dependence on the power-related reception parameters.

20 Claims, 5 Drawing Sheets

(56) References Cited

U.S. PATENT DOCUMENTS

2010/0136927 A1* 6/2010 Rofougaran .................. 455/84
2013/0265890 A1* 10/2013 Ali et al. ..................... 370/252

FOREIGN PATENT DOCUMENTS

| EP | 2 226 955 A2 | 9/2010 |
| WO | WO 2011/072010 A1 | 6/2011 |

* cited by examiner

MOBILE COMMUNICATION

CROSS REFERENCE TO RELATED APPLICATION

This application claims benefit under 35 U.S.C. §119(a) and 37 CFR. 1.55 to UK Patent Application no, GB1222189.1, filed on Dec. 10, 2012, the entire content of which is incorporated herein by reference.

FIELD OF THE INVENTION

The present disclosure relates to devices, methods and computer program products in relation to mobile/cellular communication. In particular, but not exclusively, the present disclosure relates to devices, methods and computer program products concerning two or more antennas for diversity receiving purposes.

BACKGROUND INFORMATION

Mobile and cellular communication architectures can be categorized as cellular network and ad-hoc network. In a cellular network such as Long Term Evolution (LTE), LTE-Advanced (LTE_A), Universal. Mobile Telecommunications System (UMTS), Global System for Mobile Communications (GSM), High Speed Packet Access (HSPA)/HSPA+, device to device, or the like, communication between mobile devices is routed via one or more core network elements.

In urban environments, multipath and large angular spread leads to multipath propagated signal reception. On the other hand, in a rural environment with line of sight condition, diversity/Multi Input Multi Output (MIMO) reception of the mobile device based on reception via two or more antennas, each connected with a diversity receiver, may allow a receiving communication even with a radio link at reduced performance. A transmitter of the mobile device is usually operatively bound to one of the diversity receivers. However, if the base station is poorly positioned in relation to the antennas of the mobile device, a transmitting communication link may not be possible, mobile device may drop call, or the communication link may be not optimal. This may lead not only to transmission defects but also to complete communication defects.

Hence, it is an object of the present disclosure to improve such systems.

SUMMARY OF THE INVENTION

According to first embodiments, there is apparatus for use in a mobile device, the apparatus including: a switch unit configured to switch a common connection of a transmitter and a first receiver from a first antenna to a second antenna and a connection of a respective second receiver from the second antenna to the first antenna; and at least one processor, and at least one memory including computer program code, the at least one memory and the computer program code being configured to, with the at least one processor, cause the apparatus at least to detect a switch condition that the transmitter needs to transmit via the second antenna, obtain power-related reception parameters of said first and said second receivers, cause the switch unit to switch the common connection of the transmitter and the first receiver so that the transmitter transmits via the second antenna, and adjust the power of the transmitter in dependence on the power-related reception parameters.

According to second embodiments, there is a device, including: a transceiver; at least two receivers; at least two antennas; and an apparatus as mentioned before.

According to third embodiments, there is a method for use in a mobile device, the method including: switching a common connection of a transmitter and a first receiver from a first antenna to a second antenna and a connection of a respective second receiver from the second antenna to the first antenna by a switch unit; and processing including: detecting a switch condition that the transmitter needs to transmit via the second antenna, obtaining power-related reception parameters of said first and said second receivers, causing switching of the switch unit so that the common connection of the transmitter and the first receiver is switched so that the transmitter transmits via the second antenna, and adjusting the power of the transmitter in dependence on the power-related reception parameters.

According to fourth embodiments, there is a computer program product including a non-transitory computer-readable storage medium having computer readable instructions stored thereon, the computer readable instructions being executable by a computerised device to cause the computerized device to perform the method of the third embodiments.

Further features of embodiments will become apparent from the following description of preferred embodiments, given by way of example only, which is made with reference to the accompanying drawings.

DETAILED DESCRIPTION

Generally, references to certain standards, media and/or resources in this description are intended to be examples for the purpose of illustration in order to improve the ease of understanding of the embodiments of the present disclosure. They are not to be understood as limiting the inventive concepts. Likewise, the language as well as terms used herein, such as e.g. signal names, device names and the like, are to demonstrate the embodiments only. Use of such language or terms apart from their understanding according to this disclosure shall not be applied to embodiments for the purpose of limiting its scope.

Generally, mobile devices may be user equipments (UE) such as cellular phones, smart phones, laptops, handhelds, tablets, vehicles, or the like. A mobile device may also be a module, a modem on a module, a system in a package or a system on a chip which can be connected to or inserted in a user equipment. The user equipment may be of a fixed shape or it may be used in different forms.

Although wireless communication is usually established via radio as a transmission resource, it may also be applied to ultrasonic, infrared light or the like as a transmission resource.

Herein below, however, example embodiments will be described with reference to radio communication as a wireless communication medium.

Certain applications may provide for a car environment that is challenging from an antenna point of view however, similar wireless communication environments may also be affected so that the following may be applied to other environments such as cellular phones, tablets, laptops, buildings, or the like, too.

Some embodiments enable a present hardware implementation of the mobile device to be widely maintained so that additional cost for the higher performance implementation solution can be kept small. Moreover, a platform radio frequency (RF) front end can be used as such for connecting by adding a double pole double throw (DPDT) switch, or any special purpose switch. A special purpose switch may have a capability to connect two or more throws/nodes simultaneously to a common interface point. Only a software adaption at the modem side of the mobile device may be sufficient for implementation.

It should especially be noted that the embodiments are not limited to only two antennas. If more than two antennas are provided, switching of the transmitter and a corresponding first diversity/MIMO receiver to an appropriate antenna may be followed by a further selection of an appropriate antenna of the further antennas for connection with a second diversity/MIMO receiver.

Although embodiments will be explained for example in the following with reference to vehicle-mounting, embodiments are not restricted to vehicle-mounting but may also be applied to other mobile devices, cellular devices, consumer electronics, public safety devices, or the like as will become apparent from the following description of embodiments.

According to a first embodiment, an apparatus for use in a mobile device includes a switch unit configured to switch a common connection of a transmitter and a first receiver from a first antenna to a second antenna and a connection of a respective second receiver from the second antenna to the first antenna; and a processing system configured to detect a switch condition that the transmitter needs to transmit via the second antenna, obtain power-related reception parameters of said first and said second receivers, cause the switch unit to switch the common connection of the transmitter and the first receiver so that the transmitter transmits via the second antenna, and adjust the power of the transmitter in dependence on the power-related reception parameters. The switch unit can be any switch unit capable of switching or swapping, respectively, the transmitter and the two receivers in relation to the at least two antennas. The switch condition can be any that allows deciding that the transmitter needs to transmit via the second antenna. Such a switch condition may be e, g, a current consumption, antenna environment conditions, a sensor information, a running application, application mode or status change, a positioning receiver activity, an interoperability, combinations thereof, or the like. Additionally, the switch condition can also be a simple command to switch which command is detected by the processing unit. The processing unit may also be a controller, a control unit, or the like. In an embodiment, the switch unit and the processing unit form an integral unit that is configured correspondingly. Adjustment according to the power-related reception parameters can be achieved by tuning e.g. the power of the transmitter such that reliability of a communication connection can be enhanced.

Another embodiment relates to an apparatus for use in a mobile device, the apparatus including a switch unit configured to switch a common connection of a transmitter and a first receiver from a first antenna to a second antenna and a connection of a respective second receiver from the second antenna to the first antenna, and a processing system configured to receive at least two reception signals from the first and the second receivers, in response to receipt of the at least two reception signals, evaluate a communication link via the first and the second antennas, based on the evaluation of the communication link, decide that the transmitter needs to transmit via the second antenna, obtain power-related reception parameters of said first and said second receivers, cause the switch unit to switch the common connection of the transmitter and the first receiver so that the transmitter transmits via the second antenna, and adjust the power of the transmitter in dependence on the power-related reception parameters. This embodiment allows e.g. consideration of attenuation due to cabling to different antennas being different. Moreover, also filtering and/or switching arrangements may have implementation differences between the two antenna signal paths. Furthermore, antenna gain, antenna tuner gain, antenna aperture gain differences, or the like may be taken in account. The processing system may include at least one processor, and at least one memory including computer program code, the at least one memory and the computer program code being configured to, with the at least one processor, cause the apparatus to perform various data processing tasks of embodiments described herein.

According to another embodiment, a mobile device, such as a terminal or user equipment (UE), respectively, has a communication link with a counterpart such as e.g. a Base Station (BTS) with an antenna system. The UE is using a first TX antenna to uplink. Then, the UE detects a need to change to a second TX antenna, based on e.g., received signal quality delta from both antennas, and changes transmission from the first to the second antenna. The power transmitted from the UE via the second antenna is adjusted according to a received signal power delta between the first antenna and the second antenna. The signal power delta refers to a difference of the received signal power between the first antenna and the second antenna. E.g., if the second antenna has a RX power and/or SNR which is x dB higher than that of the first antenna, then TX power in the second antenna is reduced by x dB, when swapping the TX-path from the first antenna to the second antenna, preferably just after the antennas swap. Thereafter, the UE follows a BTS Transmit Power Control (TPC) command directly or after a predefined period. In this regard, noise hot spots can be avoided due to antenna radiation gain difference and e.g. car chassis attenuation, human body part attenuation in antenna environment, or the like.

According to another embodiment, a mobile device, such as a terminal or user equipment (UE), respectively, has a communication link with a counterpart such as e.g. a Base Station (BTS) with an antenna system. The HE is using a first TX antenna to uplink. Then, the HE detects a need to change to a second TX antenna, based on e.g. current consumption, antenna environment conditions, sensor information, running application, application status change, positioning receiver activity, interoperability, or the like.

According to an embodiment, modem information is used for a processor to make a decision about an UL antenna selection in order to improve the UL data throughput in good Signal to Noise Ratio (SNR)/Reference Signal Received Power (RSRP)/Received Signal. Strength Indication (RSSI) conditions and to improve cell coverage in weak signal conditions as may e.g. appear at radio shadow, cell edges or the like. According to the decision or the network synchronization, optimal antenna selection controls are generated and conveyed for signal path selection. For control generation, an embodiment has a processor for control generation with above information. The processor may have a control algorithm in order to control the UE UL antenna and the reception parameters in radio waves reception of the mobile device.

Yet a further embodiment employs an apparatus that has a processing system configured to receive at least two reception signals from the first and the second receivers, in response to receipt of the at least two reception signals, evaluate a communication link via the first and the second antennas, and based on the evaluation of the communication link, detect the switch condition. In this embodiment, the switch condition is detected based on evaluating receiving conditions of the two receivers. For instance, when a reception power of the first receiver is low and of the second receiver is high, the transmission power after swap can be adjusted to depend on a reciprocal reception power difference.

One embodiment teaches that the processing system is configured to adjust the power of the transmitter in dependence on a discrepancy between the power-related reception parameters used by the first and said second receivers. The discrepancy can be a difference or a ratio between the power-related reception parameters. It can be determined by calculating a difference or a ratio between e.g. measured reception signal strength or the like at the first and the second receivers. The difference or ratio may be a single measurement, an average, computed from equation, or a predefined division from predefined period. The difference or ratio can be determined e.g. as a percentage e.g. in %, a voltage measured e.g. in mV, a power measured in e.g. mW or dB, or any other special purpose units.

In an embodiment, the processing system is configured to determine a difference of the power-related reception parameters used by the first and said second receivers, and adjust the power of the transmitter in dependence on the difference determined.

According to an embodiment, the processing system is configured to determine a ratio of the power-related reception parameters used by the first and said second receivers, and adjust the power of the transmitter in dependence on the determined ratio. The ratio can be determined by calculating a division between e.g. measured reception signal strength or the like at the first and the second receivers.

Yet a further embodiment teaches that the processing system is configured to combine the ratio or the difference with a transmission specific value, and, in response thereto, adjust the power of the transmitter in dependence on the combination of the ratio or the difference with the transmission specific value. So, a transmission power can be adapted considering specific deviations between transmitting and receiving via the antennas. The combination can be provided by a specific factor being calculated with the ratio or the difference. The calculation can be provided by a function such as multiplying, adding, dividing, subtracting, logarithmic, combinations thereof, or the like. A transmission specific value may be e.g. a transmission power, a MPR, a modulation, a frequency, a band, a resource block (RB), a bandwidth (BW), a number of subcarriers, a data class, a voice call, a data call, a MIMO Class, a number of aggregated carriers.

One embodiment teaches that the processing system is configured to adapt at least one of the power-related reception parameters. Tuning allows considering specific characteristics of the antennas and/or the related communication links. For instance, a factor can be included in the power-related reception parameters considering an antenna gain, an antenna tuner gain, an antenna aperture tuning gain, a signal quality, combinations thereof, or the like.

A further embodiment teaches that the power-related parameters include at least one of an antenna gain, an antenna tuner gain, and an antenna aperture gain difference of at least one of the first and the second antennas. Consequently, adjustment can be based on one or more different parameters so as to adjust the transmitter as necessary.

Another embodiment teaches that the evaluated communication link includes at least one of an uplink and/or a downlink. Especially, it is determined which of the antennas will be used for call link establishment or after transmitter has been in idle. In one embodiment, determination is based on reception parameters of the receivers.

According to an embodiment, the processing system is configured to provide adjustment of the power of the transmitter during switching of the switch unit. When designing power up and power down ramps, allowed power to switch can be taken into account in order to avoid damaging components. Adjusting the at least one reception parameter during switching of the switch unit allows enabling the communication link over the at least two diversity/MIMO receivers to continue their receiving operation nearly without interruption because the parameter exchange including the adjustment can set the at least two diversity/MIMO receivers in condition to directly proceed operation without requiring further adaptation. So, certain predefined parameter offsets can be immediately considered whereby providing a proper operation. At the same time, continuous operation of the transmission link can be achieved because the power adjustment during switching allows nearly continuous transmitting by reducing the necessity of adaptation in order to establish proper operation.

In order to provide the at least one of the reception parameters being adjusted during switching of the switch unit, one or more values related to adjustment of the at least one of the receiving parameters may be stored and/or predefined in advance. So, a fast adjustment can be achieved. However, the values may be received by measurement and may be amended themselves if necessary, e.g. because one or more of an attenuation of a connection or an active part or a tunable parts gain alters or the like.

A further embodiment teaches that the switch unit includes a double pole double throw switch or any special purpose switch.

Without limiting the scope of embodiments, embodiments are illustrated in more detail by the following description referring to the accompanying drawings.

Usually, the roof of a car is the most desired place for an arrangement of an antenna, since this location may provide for omnidirectional radiation pattern. Omnidirectional radiation pattern of such antennas is desired because, during movement of the mobile device, a communication link to a certain base station of the core network, which is usually stationary, may vary, especially, in view of direction. An omnidirectional radiation pattern of an antenna may allow near independence from direction. However, such a location usually has an undesired impact on industrial car design. Often, any additional overhang, especially on the roof, will look awkward. Therefore, technology related to antennas is supposed to be invisible for customers and hidden into an industrial design.

Figure 1:
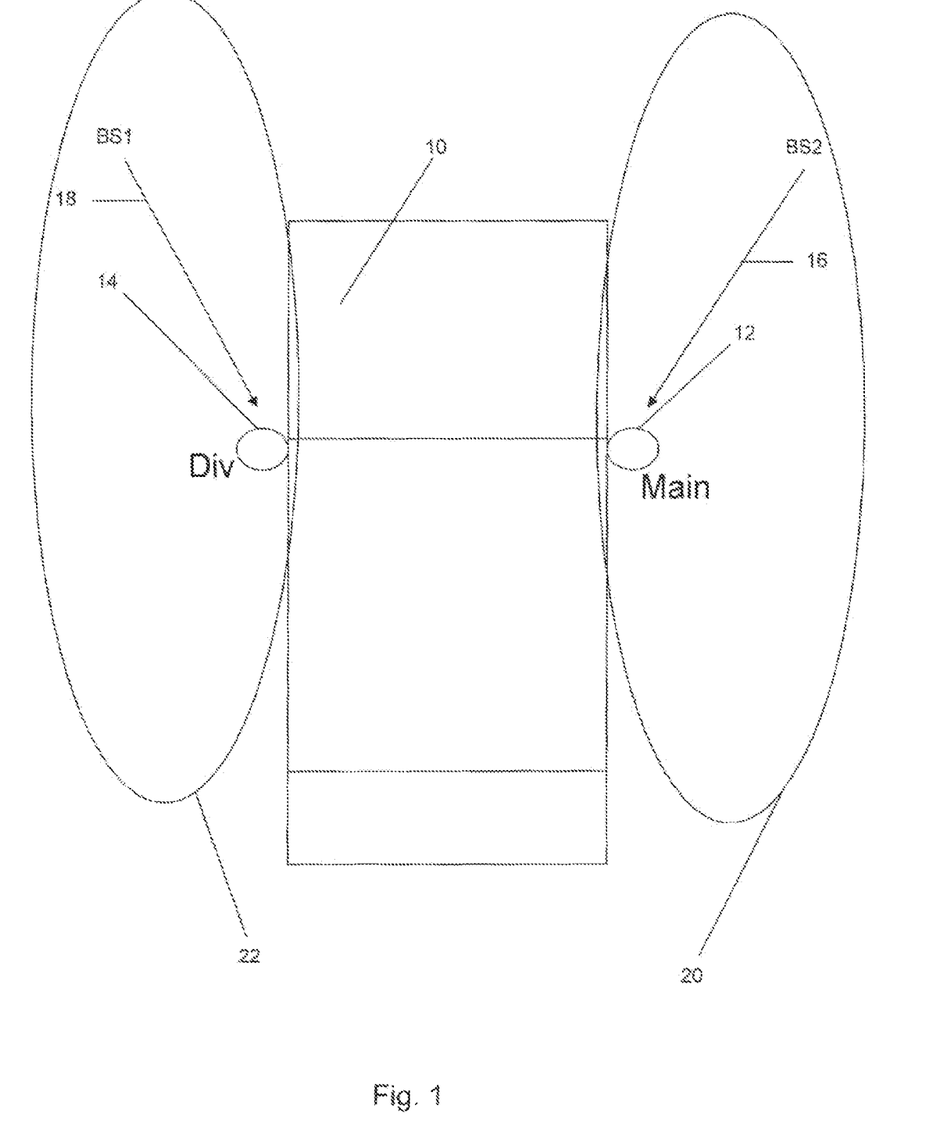
FIG. 1 shows schematically a vehicle provided having a mobile device according to an embodiment, the mobile device having two antennas each located in side mirrors of the vehicle.

Related to car design, the antenna may be provided as two antennas, each located at each of two opposite side mirrors of the car so as to reduce the effect related to the car industrial design, as shown in FIG. 1. This arrangement may result in a limited antenna radiation pattern, as will become apparent from the following discussion.

Embodiments may be used to control a transmitting antenna change and/or swap of a UE, or other like apparatus, based on signal information extracted, detected, computed, and/or received. Without being limited to the description, a described embodiment refers to a car vehicle environment mobility which is one embodiment causing variation of signaling conditions.

A mobile car with active data connection using e.g. diversity and/or MINED reception and a transmitter via two antennas may cause one of the antennas to be in worse signaling conditions in transmitting frequency when e.g. side mirror antennas are considered. Mobility of the car may cause the radio propagation environment to change rapidly, especially when considering antenna radiation patterns looking at different directions.

E.g. in vehicles, it is presented to place diversity RX antennas to side mirrors of car such as technology hidden in industrial design, e.g. no shark fins or corresponding. At urban conditions, a single side antenna may be continuously operational due to dense network base stations and a scattered fading environment with reflections. In rural areas, the data connection may drop if an UL antenna is continuously fixed at a predefined side. As a conclusion, a TX antenna switching is provided according to uplink conditions.

When antenna switching decision is carried out according to a control algorithm, there may be a better UT path available via a new antenna with certain probability when the BTS is at new antenna radiation pattern range as may be supposed e.g. with DL SNR, DL RSRP or DL RSSI, DL RSCP, DL CPICH Ec/No, an antenna environment information, a sensor information, a current consumption information which may be used for antenna swap decision making.

After having provided antenna swap, the BTS may have incorrect channel estimates for the UL signal from the new antenna, and the TX signal power from the new antenna may be far too much for the new UL propagation path. This is because the car chassis may attenuate signals by e.g. 20 . . . 30 dB, wherein such attenuation between the antenna and the BTS does not exist between the new antenna and the BTS.

When the UE makes the decision and there is a huge gain difference between the side antennas, this may cause noise hotspots in a wireless communication network and, consequently, a network capacity may be reduced.

This can escalate when multiple UEs, such as those installed on vehicles or the like, swap antennas at certain road sections. This can happen at a border between two neighboring cells, urban canyons, tunnels, or corresponding street sections where antenna decision making needs to be carried out.

Earlier implementations have focused on making the decision to swap antennas inside handheld sized mobile devices based on e.g. reception parameters, a transmitter power, an antenna VSWR, proximity sensors, using the received signal quality and the delta as the deciding factor.

When making this kind of swap brutally, the data throughput is momentarily interrupted until the link is recovered. When this happens without control, the data throughput may be affected, e.g. substantially interrupted.

In an embodiment, FIG. 1 depicts a vehicle 10 having two side mirrors 12, 14 arranged at opposite sides of the vehicle 10. One side mirror, the side mirror 12 on the right side of the vehicle 10, has an antenna designated as main, that is, this antenna is used for receiving and transmitting purposes as well. The second antenna of mirror 14 on the left side of the vehicle 10 is used for receiving purposes only and is designated as div. Both antennas are integrally formed with the corresponding mirrors or mirror housings 12, 14 or other assembly part of the apparatus. E.g., the antennas can be embedded in a silver layer of the mirrors or the like. Processing of the receiving signals of both of the antennas establishes diversity and/or MEMO reception in view of the receiving communication link or downlink (DL), respectively.

Each of the antennas in the mirrors 12, 14 has a certain communication range 20, 22 caused by a limited antenna radiation pattern. E.g., a receiving signal 18 (BS1 radio tower) transmitted from a first base station, not shown, is received by the antenna of the mirror 14 and by the antenna of the mirror 12. A receiving signal 16 (BS2 radio tower) transmitted from a second base station not shown, is received by the antenna of the mirror 12 and by the antenna of the mirror 14. In this configuration, each of both antennas, main and div, is connected via a connection with a corresponding diversity receiver. For instance, a single BTS signal may be received by two or more diversity/MIMO receivers. Moreover, signals may be sent from two BTS towers and received with two or more antennas. The transceiver/receiver may have a communication link simultaneously to one or more base station radio towers. In embodiments, operation is adapted to allow receiving signals (RX) over one or both of the antennas main, div.

Figure 4:
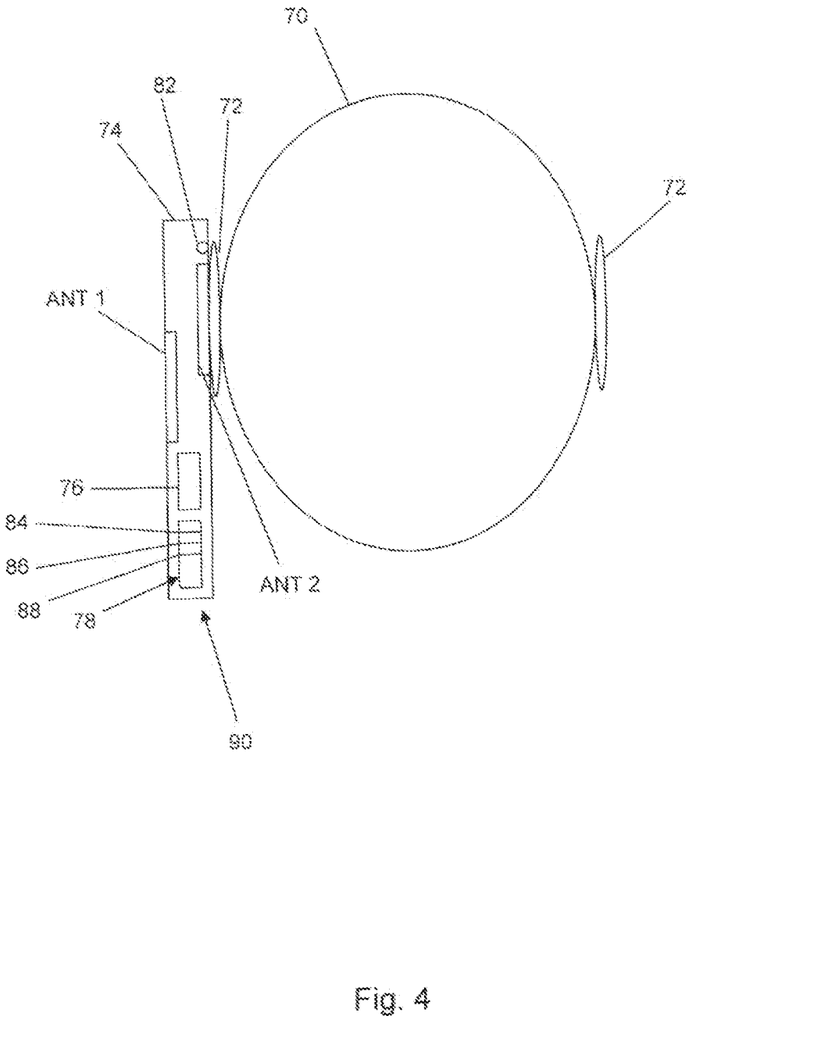
FIG. 4 shows schematically a mobile device in a first use of a user having the mobile device at his ear according to an embodiment.
Figure 5:
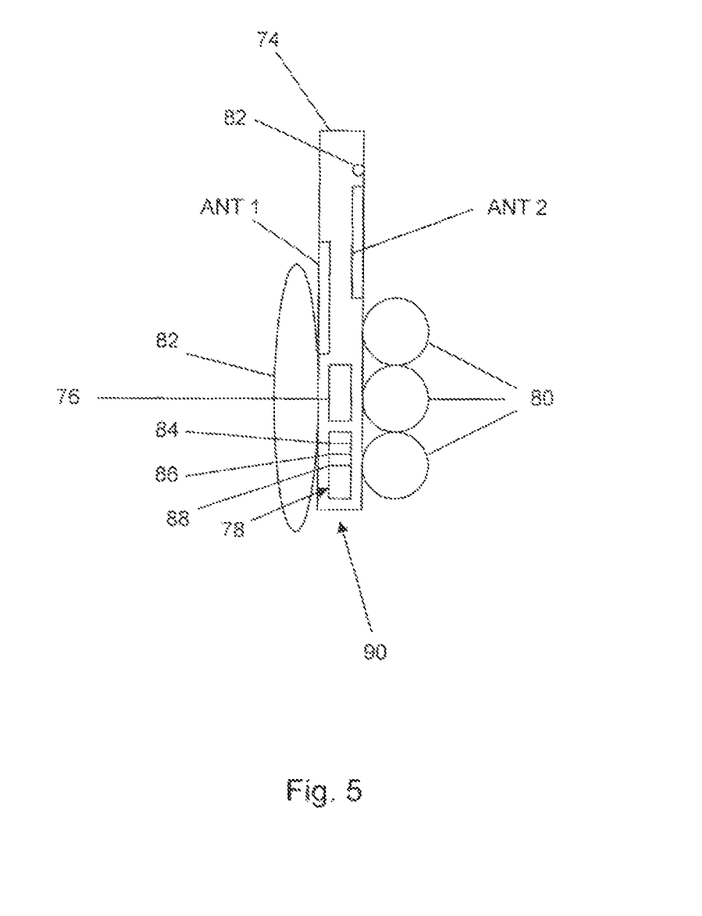
FIG. 5 shows schematically a mobile device in a second use of a user holding the mobile device in his hand according to an embodiment.

Another embodiment is schematically depicted in FIGS. 4 and 5. FIG. 4 shows a mobile device 74 as a user equipment LIE in a transverse sectional view, which can be a smart phone, a cellular phone, a tablet, an altering form factor capable communication device or the like. The mobile device 74 has a switch unit 76 which is in communication connection with a processing unit 78, presently formed by a controller such as a microprocessor. The microprocessor 78 includes a transmitter 84, a first receiver 86 and a second receiver 88. The transmitter 84 and the first receiver 86 are commonly connected to the switch unit 76. Apart thereof, the second receiver 88 is connected with the switch unit 76. Further components including user interfaces necessary to enable the mobile device 74 to operate as a phone are omitted for the ease of understanding.

The switch unit 76 is further connected with a first antenna ANT 1 and, apart thereof; with a second antenna ANT 2. In an idle status, the switch unit 76 provides connection between the transmitter 84 and the first receiver 86 and the antenna ANT 1, whereas, on the other hand, it provides connection between the second receiver 88 and the antenna ANT 2. The microprocessor 78 is adapted to provide for diversity reception by use of the two receivers 86, 88. Moreover, the switch unit 76 can, upon command from the microprocessor 78, switch over the both connections together so that the transmitter 84 and the first receiver 86 are connected with the antenna ANT 2, whereas, in turn, the second receiver 88 is connected with the antenna ANT 1. This recites a switched-over status. For this purpose, the switch unit 76 is formed as a double-pole double-throw switch. However, any other kind of suitable switch can be used as a switch unit.

As can be seen from FIG. 4, a head 70 of a user (not referenced) having two ears 72 is schematically shown. As can be further derived from FIG. 4, the antennas ANT 1 and ANT 2 of the mobile device 74 are arranged at opposite surfaces of the mobile device 74 and are offset against each other in a longitudinal direction. The microprocessor 78 is arranged at one lower end 90 of the mobile device 74. At the opposite end of the mobile device 74, an ear detector 82 is located so as to detect an ear such as the ear 72 in FIG. 4 in close proximity to the antenna ANT 2. The ear detector 82 is in communication with the microprocessor 78. According to one embodiment, the ear detector 82 is configured to detect the ear based on at least one of e.g. photo-sensing, capacitive sensing, thermo-sensing, or any other suitable technology for detecting an ear.

Still referring to FIG. 4, the mobile device 74 is arranged such that the antenna ANT 2 is close to the ear 72 of the user. The ear detector 82 detects the ear 72 and provides corresponding signaling to the microprocessor 78. In turn, the microprocessor 78 causes the switch unit 76 to maintain the before-mentioned idle status. Consequently, the exposure of the head 70 to radio energy can be limited and attenuation caused by the head 70 and the ear 72 can be reduced as well, since the transmitter transmits over the first antenna ANT 1 and thus improving communication link.

Turning now to FIG. 5, there is shown schematically the mobile device 74 as of FIG. 4 but now held in a hand of the user. Shown in FIG. 5 is the palm 82 of the hand and three of five fingers 80. The hand grips the mobile device 74 at the lower end 90 close to the antenna ANT 1. The ear detector 82 detects absence of an ear and provides corresponding signaling to the microprocessor 78. In turn, the microprocessor 78 causes the switch unit 76 to switch from the idle status to the switched-over status so that the transmitter 84 transmits via the second antenna ANT 2. This allows limiting the exposure of the hand to radio energy and reducing attenuation caused by the hand as well thus improving communication link.

If the conditions change again, e.g. because the ear detector 82 detects an ear again, the microprocessor 78 will cause the switch unit 76 to switch back to the idle status, as detailed above.

According to an embodiment, the at least first and second receivers are MIMO receivers or diversity receivers. The term diversity receiver such as for e.g. the 2G, 3G standard is used for a receiver capable of receiving single signal for DL during signal fading conditions to improve single signal reception. The term MIMO receiver (LTE™, LTE-A, WiFi™) is used for a receiver capable of receiving multiple different data streams as a DL method to improve data throughput. Consequently, the MIMO receiver is adapted to operate in a MIMO communication system and employs reception of multiple signals (MIMO mode) whereas a diversity receiver is adapted to operate in a diversity mode in order to employ diversity reception. The first and the second receiver can also be adapted to operate in both modes, wherein the receivers can change their mode, preferably together, e.g. by switching between the modes, or the like. The connection may preferably be an electric connection such as an electric conductor, an electric line, an electric wire, or the like. The connection provides electric connection between those components electrically connected therewith.

Since usually one transmitter transmitting signals (TX) is provided and this transmitter forms an integral unit with one of the diversity/MIMO receivers, so as to form e.g. a transceiver, a transmitting link or uplink (UL), respectively, is possible over the main antenna which the combination unit formed or the transceiver, respectively, is connected with. The integral unit, especially, the transmitter and the corresponding first receiver may be connected with the antenna via a common connection. Under such conditions, a transmitting link may become disrupted and the overall communication link may be affected in an undesired way, although data reception may still be possible because of the diversity operation of the receivers.

In order to provide an improvement, embodiments propose a new scheme of antenna management of mobile devices in a communication network. Embodiments cover how a mobile device such as a user equipment UE control may be implemented with switching UL/DL diversity/MIMO antennas.

Each of the antennas can be used in a dual mode, that is, it can be used for the purpose of transmission and reception as well. Antennas may share functionality of one or more other signals which may be originated from one or more communication counterparts.

According to embodiments, information related to receiving, such as receiving parameters or the like, is used to enable a decision that an antenna is to be connected with the transmitter. Moreover, it can be provided that, according to a further embodiment, receiving information is supplied to the transmitter and/or both of the diversity receivers, respectively, to enable substantially continuous data transmission and reception.

Especially, at urban conditions, a single antenna such as a single side antenna of a car may be continuously operational due to dense network base stations and a scattered fading environment with reflections. However, in rural areas, the data connection may drop if an UL antenna, that is the antenna used for transmission, is continuously fixed at a predefined side. As a conclusion, embodiments propose that the TX antenna is switched according to uplink and/or downlink conditions.

In some embodiments, transmitter related information may trigger the antenna swap. Criteria for triggering antenna swap may include that the highest transmitter power level was achieved; predefined highest power levels are used for a predefined time period; or the like. Alternatively, triggering may occur because UL quality is poor via used antenna based on ACK/NACK feedback from BTS or a predefined amount of retransmission exceeded. Alternatively, triggering criteria may include any of transmitter-related information and/or receiver-related information, sensor information, antenna environment information, running application information, in interoperability information, positioning receiver information, power consumption, mechanical form factor related information, or any combination thereof.

According to an embodiment, when main receiver modem and diversity receiver modem antennas are swapped, the transmitter and both of the receivers are provided with corresponding information, especially parameters so that their operation can preferably be continued substantially without interruption or substantially without data throughput degradation.

Figure 3:
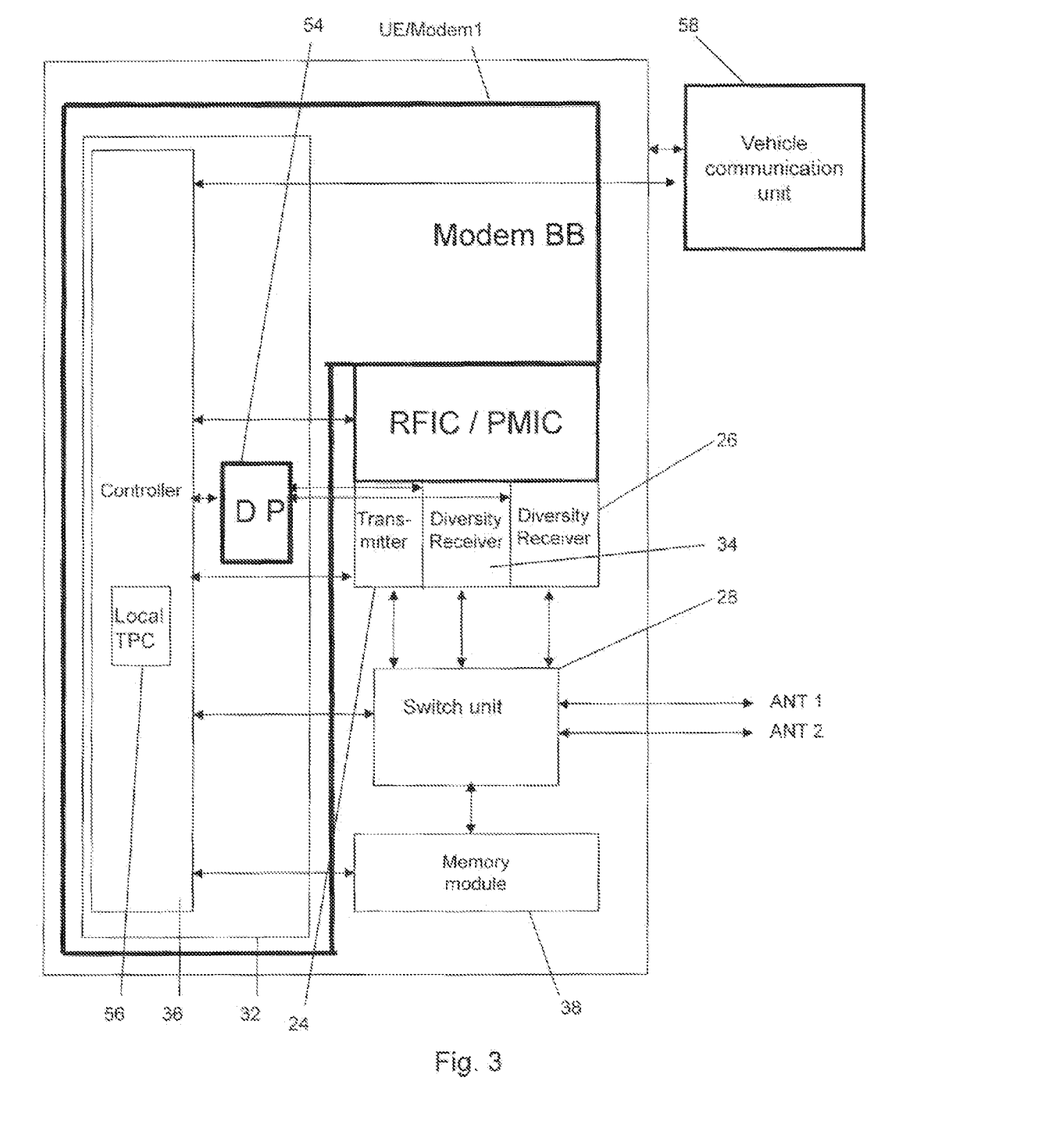
FIG. 3 shows a user equipment according to an embodiment.

According to an embodiment, one method to implement a transmission link or transmission path, respectively, (TX) antenna swap between two antennas, namely, a main antenna (ANT 1) and a div antenna (ANT 2), is presented in FIG. 1 with further reference to FIG. 3. The antenna ANT 1 may be located in right mirror or mirror housing 12 and the antenna ANT 2 may be located in left mirror or mirror housing 14 of the vehicle 10. Instead of mirror housing, the antennas may be located to any other kind of assembly part of the apparatus. In a mobile phone, antennas may be located in a top part and a bottom part of the device taking into account variations in form factor and use eases with different applications and radios.

FIG. 3 shows a mobile device such as a user equipment UE that also may be referred to as modem 1 and that may be arranged in the vehicle 10 or the mobile phone 74. The user equipment UE is in communication with a vehicle communication unit 58. However, in the case of the mobile device 74, the vehicle communication unit 58 is to be omitted. As also depicted in FIG. 3, the user equipment UE includes an apparatus 32. The apparatus 32 may be configured as a semiconductor chip, a hardware circuitry, a processing unit, combinations thereof, or the like. The apparatus 32 includes a processing system which is, in this embodiment, formed by a controller 36 which, in turn, communicates with a switch unit 28. Moreover, the user equipment UE includes a transmitter 24 and a first diversity receiver 34 that are connected via a common connection and the switch unit 28 with the antenna ANT 1. The switch unit 28 may be a hardware switch such as DPDT or may be provided by a special purpose circuitry controlled by the controller 36. The switch unit 28 may be included by the apparatus 32 in order to form an integral unit with the apparatus 32, or it may be a separate component, as indicated in FIG. 3.

Moreover, a second diversity receiver 26 is provided by the user equipment UE which is connected via a connection and the switch unit 28 with the antenna ANT 2. Additionally referring to FIG. 3, the antennas ANT 1 and ANT 2 are each connected with the switch unit 28 via a corresponding connection, too. In the embodiment according to FIG. 3, the antennas ANT 1 and ANT 2 are external of the user equipment UE. However, the user equipment UE or module or package may also include such antennas.

The switch unit 28 is controlled by the controller 36 controlling at least the operation related to switching. Alternatively, the switch unit 28 may be connected to the controller 36.

Moreover, the controller 36 is in communication connection with a memory module 38. Likewise, the switch unit 28 is in communication connection with the memory module 38.

The user equipment UE further includes a baseband modem (Modem BB) which is in communication with the controller 36. In this embodiment, the Modem BB and the apparatus 32 including the controller 36 are integral with each other. Preferably, the power detection DP 54, a power control such as a local transmission power control (TPC) 56 and the control loop are included in Modem BB functionality. The user equipment UE also includes a Radio Frequency Integrated Circuit (RFIC) and a Power Management Integrated Circuit (PMIC), both in communication with the controller 36 and further operating with the transmitter 24, and the two diversity receivers 26, 34. In some embodiments, the controller 36 functionality may be included in modem BB or other special purpose processor.

Although some of the before-mentioned modules and units are not part of the apparatus 32 of the user equipment UE (FIG. 3), the apparatus 32 may be adapted to include further units and modules such as the transmitter 24, the first and the second diversity receivers 34, 26, the memory module 38, the switch unit 28, and the like. In some embodiments, the user equipment UE may have two or more transmitters and two or more receivers, alternate modem receiver/s and transmitter/s, positioning receivers, alternate radio access technology and the like. Furthermore mobile phone or UE may contain at least one or more application processor, display, touch display, camera, keypad, microphone, speaker, sensors, user interface, battery, wired connections, wireless connections, etc.

The switch unit 28 is interconnected between the transmitter 24 and the first diversity receiver 34 as well as the second diversity receiver 26, on the one hand, and the two antennas ANT 1 and ANT 2, on the other hand. The controller 36 controls the switch unit 28 to cause the transmitter 24 and the first diversity receiver 34 to be switchably connected with one of the two antennas ANT 1 and ANT 2 and the second diversity receiver 26 to be switchably connected with another one of the two antennas ANT 1 and ANT 2. Preferably, in an idle status, the transmitter 24 and the first diversity receiver 34 are connected with the antenna ANT 1, and the second diversity receiver 26 is connected with the antenna ANT 2. The switch unit 28 can have a switch of the type double pole double throw DPDT or special purpose switch suited for radio frequency RF.

The controller 36 includes the local Transmission Power Control (TPC) 56 which is adapted to control the transmission power of the transmitter 24 in the range of the switching of the antennas ANT 1 and ANT 2. In this regard, the term "control the transmission power" corresponds to adjusting the transmission power of the transmitter 24 in dependence on power-related reception parameters of the receivers 26, 34. After switching has been completed, power control by the network is resumed again. Correspondingly, during the switching operation, the local TPC 56 allows the UE to provide power control of the transmitter 24 independent from a network-controlled TPC. The local TPC 56 is shown in FIG. 3 as an integral component with the controller 36. However, the local TPC 56 may also be a separate component which is included by the user equipment UE.

Moreover, the apparatus 32 includes a power detector (DP) 54 that is in the embodiment of FIG. 3 separate from the controller 36. However, the DP 54 may also be employed as being integral with the controller 36. The DP 54 detects power-related reception parameters of the first and the second receivers 26, 34. For this purpose, the DP 54 is in communication connection with the first and the second receivers 26, 34. The DP 54 is in further communication connection with the controller 36 in order to provide the controller 36 with the detected power related reception parameters.

In FIG. 3, the antennas ANT 1 and ANT 2 are for dual use that is transmission and reception as well. The switch unit 28 can include active and passive parts, one or more of frequency selective components, switches, controllers, control powering, a diversity switch in order to enable the dual use, carrier aggregation use, or multi modem use.

The controller 36 may be a separate component of the user equipment UE. However, it also may be integral with at least one of the Modem BB, the RFIC, the PMIC, the vehicle controller unit, and the memory module 38. Controls and control information may be originated by one or more of the before-mentioned components.

Turning to FIG. 1, user equipment modem data path controlling with switching uplink (UL)/downlink (DL) diversity antennas ANT 1, ANT 2 is described in more detail according to an embodiment. When the transmission path TX is switched to alternate antenna there is also impact on reception links, reception paths, respectively (RX). Switching may impact a data reception throughput/data connection when the common connection of the transmitter 24 in combination with the first diversity receiver 34, and the connection of the second diversity receiver 26 are swapped with respect to the connections of the antennas ANT 1 and ANT 2. Furthermore, a reception problem can be that reception signal levels in the different antennas may vary with side mirror antennas ANT 1 and ANT 2, which have directivity to different directions. An improved controlling is desired to maintain the data reception throughput/connection reliability.

The problem is not only initiated from an automobile environment but also from corresponding reception performance problems that may be met with radio apparatuses in different use case scenarios. Switching timing selection, transmission power ramp up/down profile/timing with Radio Frequency (RF) Front End (FE) DPDT switch implementation may need to take into account breaks in the RX and/or TX data stream of Frequency Division Duplexing (FDD) and/or Time Division Duplexing (TDD) radio communication systems, or just do brutal switching when needing to take account of components reliability.

If the transmission path TX is switched alone between the antennas ANT 1 and ANT 2, a main RX modem, namely, diversity receiver 34, and a diversity RX modem of the diversity receiver 26 reception will not be impacted. However, this embodiment suffers from a high TX insertion loss, cost due to duplicated front end, and an extra (research and development) R&D platform hardware work.

The processing system or controller 36, respectively, is configured to control the transmitter 24 and at least two diversity receivers 34, 26, wherein the first antenna ANT 1 is assigned to said transmitter 24 and the first diversity receiver 34 and the respective second antenna ANT 2 is assigned to the respective second diversity receiver 26 in an idle status. The controller 36 is further configured to receive at least two diversity reception signals, evaluate a communication link between said apparatus 32 and a communication counterpart, and, based on the detection of a switch condition such as the evaluation of the communication link, decide that the transmitter 24 needs to be assigned to transmit via the second diversity antenna ANT 2, obtain, especially, detect reception parameters that may include channel estimates and/or channel interference parameters used by said at least two diversity receivers 34, 26, and switch the transmitter 24 to transmit via the second antenna ANT 2, and exchange reception parameters, channel estimates, or the like that may include channel interference parameters between the at least two diversity receivers 34, 26. The controller 36 is further connected with the memory module 38 so that data such as the parameters can be stored in or retrieved from the memory module 38.

The user equipment UE has a communication link with at least one counterpart as e.g. a network component, such as a base station BTS, via the antenna system including the antennas ANT 1 and ANT 2. In some communication embodiments, the user equipment UE may have a communication link with two or more communication counterparts such as e.g. base stations BTS. Antenna selection criteria can also take account to alternate a transmitter or modem communication uplink and/or downlink quality.

In an alternate embodiment that may employ MIMO, the diversity receivers 26, 34 can both be provided as MIMO receivers instead.

According to another embodiment, the apparatus 32 which may be for use in a mobile device, includes a switch unit 28 configured to switch a common connection of a transmitter 24 and a first diversity/MIMO receiver 34 from a first antenna ANT 1 to a second antenna ANT 2 and a connection of a respective second diversity/MIMO receiver 26 from the second antenna ANT 2 to the first antenna ANT 1. Preferably, each of the antennas ANT 1 and ANT 2 is also connected with the switch unit 28 via corresponding antenna connection. The apparatus 32 further includes a processing system, such as the controller 36 which may also be a circuitry, configured to control switching of the switch unit 28, receive at least two diversity reception/MIMO signals from the first and the second diversity/MIMO receivers 34, 26, in response to receipt of the at least two diversity receptor/MIMO signals, evaluate a communication link via the first and the second antennas ANT 1, ANT 2 to a counterpart, based on the evaluation of the communication link, decide that the transmitter 24 needs to transmit via the second antenna ANT 2, obtain, especially, detect reception parameters and/or channel estimates that may include channel interference parameters used by said first and said second diversity/MIMO receivers 34, 26, cause the switch unit 28 to switch the common connection of the transmitter 24 and the first diversity/MIMO receiver 34 so that the transmitter 24 transmits via the second antenna ANT 2, and exchange reception parameters and/or channel estimates that may include channel interference parameters between the at least two diversity/MIMO receivers 34, 26. Preferably, switching of the common connection and the connection of the second diversity/MIMO receiver 26 is provided simultaneously as may be realized by a DPDT or a special purpose switch unit 28.

According to another embodiment, the apparatus 32 is additionally provided with a processing system that is configured to adjust at least one of the reception parameters. The processing system may be integral with the controller 36 or it may be established by a hardware circuitry, a combination of the controller 36 and a hardware circuitry, or the like. This embodiment allows adjusting of at least one of the reception parameters due to implementation and performance differences, e.g. when attenuation, phase, and/or delay due to cabling, an antenna gain, an antenna tuner gain, an antenna aperture gain, a filtering and/or switching to different antennas ANT 1, ANT 2 is different. In such case, such known differences can be taken into account when making the parameter exchange. Preferably, a certain predefined parameter offset can be taken into account when exchanging the at least one reception parameter, and, based thereon, one or more parameters may be adjusted related to switching. Adjustment of the at least one reception parameter can be provided just before swap of the antennas ANT 1, ANT 2 or just after.

Preferably, the processing system, which may be established by the controller 36, is configured to provide adjustment of the at least one of the reception parameters during switching of the switch unit 28. For this purpose, the adjustment can be triggered by a signal causing the switch unit 28 to switch.

This embodiment allows e.g. considering attenuation due to cabling to different antennas being different. Moreover, also filtering and/or switching antenna gain, antenna tuner gain, antenna aperture gain, and arrangements may have implementation differences between the two antenna signal paths. Adjusting the at least one reception parameter during switching of the switch unit 28 allows enabling the at least two diversity/MIMO receivers 34, 26 to continue their receiving operation nearly without interruption because the parameter exchange including the adjustment can set the at least two diversity/MIMO receivers 34, 26 in condition to directly proceed operation without the need for further adaptation. So, certain predefined parameter offsets can be immediately considered whereby providing a proper operation.

In order to provide the at least one of the reception parameters being adjusted during switching of the switch unit 28, one or more values related to adjustment of the at least one of the receiving parameters may be stored and/or predefined in advance. So, a fast adjustment can be achieved. However, the values may be received by measurement and may be itself amended if necessary, e.g. because attenuation of a connection alters or the like.

Embodiments allow corresponding improvement by providing a control algorithm to be implemented with switching UL/DL diversity antennas.

Figure 2:
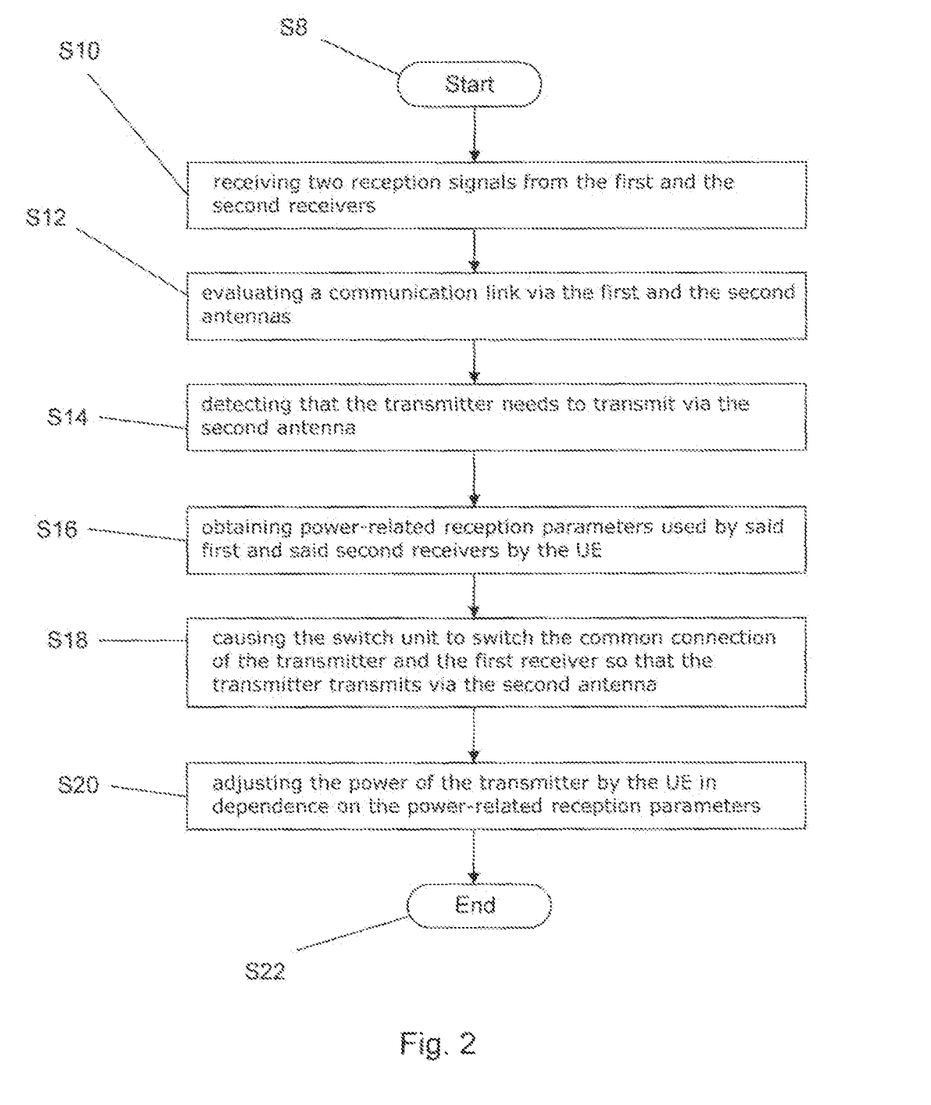
FIG. 2 shows schematically a flow chart of a first process according to an embodiment for switching the transceiver and the receivers.

An embodiment is depicted in FIG. 2 showing a flow chart of a method that can be applied to a mobile device such as e.g. the UE shown in FIG. 3, the operation can be as follows:

The process starts at step S8 in the before mentioned idle status, that is, the transmitter 24 and the first receiver 36 are connected with the antenna ANT 1 via the switch unit 28, and the second receiver 26 is connected with the antenna ANT 2 via the switch unit 28. In this idle status, the power transmitted by the transmitter 24 is controlled by the network-related TPC. At this time, the local TPC 56 is preferably not involved in the power control of the transmitter 24.

At step S10, the processing system, such as the controller 36, receives at least two reception signals, such as radio wave signals, from the first and the second receivers 26, 34. Reception is preferably established over the two antennas ANT 1, ANT 2. Consequently, the TX path is established via the first antenna ANT 1 in the idle status.

In order to detect a switch condition, the user equipment UE evaluates a communication link via the first and the second antennas ANT 1, ANT 2 at step S 12. For this purpose, the control module 36 may obtain (for example detects) reception conditions, or parameters, respectively, in radio waves signal reception at step S14.

In further embodiments, the switch condition may also be caused by one of at least a sensor information, an antenna environment information, a running application information, an application status change information, an interoperability information, a positioning receiver information, a power consumption, a mechanical form factor related information, combinations thereof, and the like.

In order to provide such information, the control module 36 records the parameters needed such as reception parameters or the like, related to both of the antennas ANT 1, ANT 2, or diversity/MIMO receivers 26, 34, respectively. Far this purpose, the control module 36 may record such parameters from both, the main receiver or main RX modem 34, respectively, and the alternate diversity/MIMO receiver or alternate diversity/MIMO RX modem 26, respectively, related to radio wave reception.

Thereafter, the recorded data, which may be stored in the memory module 38, are processed by the controller 36 so that a decision on UL antenna selection can be made thereon. In an alternative implementation, the data is recorded all the time and it is used for antenna switching when a need for that is detected.

In response to evaluating, a need to swap the TX path from the antenna ANT 1 to the antenna ANT 2 is determined or detected, respectively. Consequently, the controller 36 decides at step S14 that the transmitter 24 needs to transmit via the second antenna ANT2.

According to an embodiment, at step S14, the user equipment UE additionally switches the power control of the transmitter 24, as usually controlled by the network-related TPC, to the local TPC 56 of the controller 36.

Next, the controller 36 obtains power-related reception parameters of said first and said second receivers 26, 34 at step S16, preferably by use of the DP 54. The power-related parameters can be stored in the memory module 38 to be available when switching.

Then, the user equipment UE, especially, the controller 36, causes the switch unit 28 to switch at step S18, wherein also the recorded parameters are switched between the main diversity/MIMO receiver 34 and the diversity/MIMO receiver 26. Switching causes the switch unit 28 to switch the common connection of the transmitter 24 and the first receiver 34 so that the transmitter 24 transmits via the second antenna ANT 2. Simultaneously, the switch unit 28 switches the second receiver 26 from the first antenna ANT 1 to the second antenna ANT 2.

In embodiments, at the same time, the controller 36 causes adjusting the power of the transmitter 24 at step S20 by use of the local TPC 56. So, adjusting is provided under the control of the user equipment UR and, preferably, without control of the network-related TPC. Adjusting is provided in dependence on the power-related reception parameters and may further include e.g. calculating the power for the transmission of the transmitter 24 dependent on a difference of received power values detected by the DP 54. So, if e.g. attenuation of the transmission is smaller than before switching, the transmission power of the transmitter 24 is reduced correspondingly. Instead of the difference, a ratio of the received power values can also be used.

The process ends at step S22. Preferably, ending includes switching back the control of the transmit power of the transmitter 24 from the local TPC 56 of the user equipment UE to the network-related TPC, So, further operation can proceed as usual as e.g. in LIE communication network or the like. During the switching process, a vast adjustment of the transmit power can be achieved, especially, independent from signaling with network components.

So, operation of the first diversity receiver 34 and the second diversity receiver 26 can be continued substantially without data throughput reception losses at step S20, whereby, at the same time, an excessive power exposure caused by the transmitter 24, after switching has been provided, can be avoided. Data reception in each receiver modem can be continued with controlling parameters of the corresponding alternate modem. This procedure can be repeated anytime. Instantly, after switching has been completed, receiving of the at least two signals with the first and second receivers 26, 34, which may be diversity/MIMO receivers, is continued. Preferably, continuation is essentially immediate without substantive delay.

In an alternative embodiment, analog and digital reception parameters and/or channel interference parameters may be stored in the memory module 38 at any time during reception.

Other systems can also benefit from the principles presented herein as long as they have identical or similar properties such as mobile communication in any communication band.

By use of embodiments, network capacity degradation can be avoided or reduced due to reduction of noise hot spots, which may impact all active data links in a cell. Cell coverage in weak signal conditions such as e.g. at cell edges, radio wave shadow conditions, or the like can be improved.

Embodiments of the present disclosure may be used with FDD and TDD communication radio link, intra band carrier aggregation, inter band carrier aggregation, contiguous and non-contiguous carrier aggregation, or the like. Furthermore, the user equipment UE radio communication links may use the same or different radio communication protocol/system and may have communication links to same or different communication counterparts.

Embodiments of the present disclosure may be implemented in software, hardware, application logic or a combination of software, hardware and application logic. The software, application logic and/or hardware generally reside on control modules of terminal devices or network devices.

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

The present disclosure can be implemented in user equipments or smart phones, or personal computers connectable to such networks. That is, it can be implemented as/in chipsets, modem on modules, system on chip, system on chip to connected devices, and/or modems thereof.

As used in this application, the terms "unit", "module", "processing system", and "circuitry" refer to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition applies to all uses of those terms in this application, including in any claims.

As a further example, as used in this application, the terms "unit", "module", "processing system", and "circuitry" would also cover an implementation of merely a processor (or multiple processors) or portion of a processor and its (or their) accompanying software and/or firmware. The terms "unit", "module", "processing system", and "circuitry" would also cover, for example and if applicable to the particular claim element, a baseband integrated circuit or applications processor integrated circuit for a mobile phone or a similar integrated circuit in server, a cellular network device, or other network device. The processing system may include at least one processor, and at least one memory including computer program code, the at least one memory and the computer program code being configured to, with the at least one processor, cause an apparatus and/or computerized device to perform various data processing tasks of embodiments described herein.

If desired, the different functions discussed herein may be performed in a different order and/or concurrently with each other. Furthermore, if desired, one or more of the above-described functions may be optional or may be combined.

Although various aspects of embodiments are set out in the independent claims, other aspects of embodiments include other combinations of features from the described embodiments and/or the dependent claims with the features of the independent claims, and not solely the combinations explicitly set out in the claims. Especially, the embodiments described may be combined in various manners so as to adapt embodiments to individual requirements without departing from the scope of embodiments.

The above embodiments are to be understood as illustrative examples. Further embodiments of are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the embodiments, which is defined in the accompanying claims.

LIST OF ACRONYMS

ACK: Acknowledge
BB: baseband
BTS: Base Station
BW: Bandwidth
CPICH Ec/No: Pilot channel quality energy per chip over total received power spectral density
DPDT: double pole double throw
DL: downlink
FDD: Frequency Division Duplexing
FE: Front End
GSM: Global System for Mobile Communications
HSPA: High Speed Packet Access
LTE: Long Term Evolution
LTE-A: LTE Advanced
MIMO: Multiple Input Multiple Output
MPR: Maximum power reduction
NACK: Non-Acknowledge
PUCCH: Physical Uplink Control Channel
RB: Ressource block
RF: Radio Frequency
RSCP: Reference Signal Code Power
RSRP: Reference Signal Received Power
RSSI: Received Signal Strength Indication
RX: receiving signal, reception link, reception path
SNR: Signal to Noise Ratio
TDD: Time Division Duplexing
TPC: Transmission Power Control
TX: transmitting signal, transmission link, transmission path
UE: user equipment
UMTS: Universal Mobile Telecommunications System
UL: uplink
VSWR: forward standing wave ratio

The invention claimed is:

1. An apparatus for use in a mobile device, the apparatus comprising:

a switch unit configured to switch a common connection of a transmitter and a first receiver between a first antenna and a second antenna and a connection of a respective second receiver between the second antenna and the first antenna; and at least one processor, and at least one memory including computer program code, the at least one memory and the computer program code being configured to, with the at least one processor, cause the apparatus at least to:

obtain a first power-related reception parameter of the first receiver receiving via the second antenna, and a second power-related reception parameter of the second receiver receiving via the first antenna;

cause the switch unit to connect the common connection of the transmitter and the first receiver with the second antenna so that the transmitter transmits via the second antenna; and calculate a reduction in transmission power for the transmitter to transmit via the second antenna, corresponding to a ratio of the second power-related reception parameter to the first power-related reception parameter, a difference between the second power-related reception parameter and the first power-related reception parameter, or a combination thereof.

2. The apparatus according to claim 1, wherein the at least one memory and the computer program code are configured to, with the at least one processor, cause the apparatus at least to:

receive at least two reception signals from the first and the second receivers;

in response to receipt of the at least two reception signals, evaluate a communication link via the first and the second antennas; and detect a switch condition for the transmitter at least on the basis of the evaluation of the communication link.

3. The apparatus according to claim 2, wherein the evaluated communication link comprises at least one of an uplink and/or a downlink.

4. The apparatus according to claim 2, wherein the detected switch condition is caused by one or more of:
- current consumption information,
- sensor information,
- running application information,
- application status change information,
- positioning receiver activity information, or
- interoperability information.

5. The apparatus according to claim 1, wherein the at least one memory and the computer program code are configured to, with the at least one processor, cause the apparatus at least to adjust the power of the transmitter according to the calculated reduction in transmission power.

6. The apparatus according to claim 1, wherein the at least one memory and the computer program code are configured to, with the at least one processor, cause the apparatus to detect a switch condition that the transmitter is to transmit via the second antenna.

7. The apparatus according to claim 1, wherein the at least one memory and the computer program code are configured to, with the at least one processor, cause the apparatus at least to combine the ratio or the difference with a transmission specific value, and, in response thereto, calculate the reduction in transmission power for the transmitter according to the combination of the ratio or the difference with the transmission specific value.

8. The apparatus according to claim 1, wherein the at least one memory and the computer program code are configured to, with the at least one processor, cause the apparatus to at least one of:
- adapt at least one of the power-related reception parameters; and
- wherein the power-related parameters comprise at least one of an antenna gain, an antenna tuner gain, and an antenna aperture gain difference of at least one of the first and the second antenna.

9. The apparatus according to claim 1, wherein the at least one memory and the computer program code are configured to, with the at least one processor, cause the apparatus to at least one of:
- provide adjustment of the transmission power of the transmitter during switching of the switch unit; and
- wherein the switch unit comprises a double pole double throw switch or a special purpose switch.

10. A device, comprising:
- transceiver;
- at least two receivers;
- at least two antennas; and
- an apparatus according to claim 1.

11. A method for use in a mobile device, the method comprising:
- switching a common connection of a transmitter and a first receiver between a first antenna and a second antenna and a connection of a respective second receiver between the second antenna and the first antenna by a switch unit; and
- processing comprising:
  - obtaining a first power-related reception parameter of the first receiver receiving via the second antenna, and a second power-related reception parameter of the second receiver receiving via the first antenna;
  - causing the switch unit to connect the common connection of the transmitter and the first receiver with the second antenna so that the transmitter transmits via the second antenna; and
  - calculating a reduction in transmission power for the transmitter to transmit via the second antenna, corresponding to a ratio of the second power-related reception parameter to the first power-related reception parameter, a difference between the second power-related reception parameter and the first power-related reception parameter, or a combination thereof.

12. The method according to claim 11 wherein the processing further comprises:
- receiving at least two reception signals from the first and the second receivers;
- in response to receipt of the at least two reception signals, evaluating a communication link via the first and the second antennas; and
- detecting a switch condition for the transmitter at least on the basis of the evaluation of the communication link.

13. The method according to claim 12, wherein the evaluated communication link comprises at least one of an uplink and/or a downlink.

14. The method according to claim 12, wherein the detected switch condition is caused by one or more of:
- current consumption information,
- sensor information,
- running application information,
- application status change information,
- positioning receiver activity information, or
- interoperability information.

15. The method according to claim 11, wherein the processing comprises adjusting the power of the transmitter according to the calculated reduction in transmission power.

16. The method according to claim 11, wherein the processing further comprises detecting a switch condition that the transmitter is to transmit via the second antenna.

17. The method according to claim 11, wherein the processing further comprises combining the ratio or the difference with a transmission specific value, and, in response thereto, calculating the reduction in transmission power for the transmitter according to the combination of the ratio or the difference with the transmission specific value.

18. The method according to claim 11, wherein the processing further comprises at least one of:
- adapting at least one of the power-related reception parameters; and
- wherein the power-related parameters comprise at least one of an antenna gain, an antenna tuner gain, and an antenna aperture gain difference of at least one of the first and the second antenna.

19. The method according to claim 11, wherein the processing comprises providing adjustment of the transmission power of the transmitter during switching of the switch unit.

20. A computer program product comprising a non-transitory computer-readable storage medium having computer readable instructions stored thereon, the computer readable instructions being executable by a computerized device to cause the computerized device to perform a method according to claim 11.

* * * * *